United States Patent
Schmidt et al.

[11] Patent Number: 5,562,827
[45] Date of Patent: Oct. 8, 1996

[54] HEAT-STERILIZABLE SPIRAL-WOUND MEMBRANE FILTER CARTRIDGE

[75] Inventors: Hans-Weddo Schmidt, Hardegsen; Dieter Melzner, Göttingen, both of Germany

[73] Assignee: Sartorius AG, Germany

[21] Appl. No.: 544,846

[22] Filed: Oct. 18, 1995

[30] Foreign Application Priority Data

Aug. 24, 1993 [DE] Germany ............ 43 28 407.8

[51] Int. Cl.[6] ............ B01D 27/06; B01D 63/00
[52] U.S. Cl. ............ 210/493.4; 210/321.74; 210/321.83; 210/487; 264/48
[58] Field of Search ............ 210/493.4, 321.74, 210/321.84, 493.1, 500.1, 487; 264/48; 96/8

[56] References Cited

U.S. PATENT DOCUMENTS

| | | | |
|---|---|---|---|
| Re. 26,097 | 11/1966 | Michaels | 210/321.74 |
| 4,033,878 | 7/1977 | Foreman et al. | 210/321.74 |
| 4,770,775 | 9/1988 | Lopez | 210/321.83 |
| 4,842,736 | 6/1989 | Bray et al. | 210/321.74 |
| 4,853,128 | 8/1989 | Wrasidlo et al. | 210/636 |
| 4,906,372 | 3/1990 | Hopkins | 210/321.83 |
| 5,073,263 | 12/1991 | Fagundes et al. | 210/321.83 |
| 5,128,037 | 7/1992 | Pearl et al. | 210/321.74 |
| 5,192,437 | 3/1993 | Chang et al. | 210/321.83 |
| 5,275,726 | 1/1994 | Feimer et al. | 210/321.74 |

*Primary Examiner*—Ana Fortuna
*Attorney, Agent, or Firm*—Chernoff, Vilhauer, McClung & Stenzel

[57] ABSTRACT

There is disclosed a heat-sterilizable spiral-wound filtration module having an outer shell comprising a cord, fabric or laminate consisting of a heat-resistant rigid first polymer encased within a thermoplastic second polymer.

10 Claims, 1 Drawing Sheet

HEAT-STERILIZABLE SPIRAL-WOUND MEMBRANE FILTER CARTRIDGE

BACKGROUND OF THE INVENTION

The invention concerns a heat-sterilizable spiral-wound, cross-flow, membrane filter cartridge.

Sterilizable filter modules are required for filter processes in the fields of pharmaceuticals, biotechnology, laboratory research, as well as in the food and beverage industries. Such applications require the separation of microorganisms from the fluid to be filtered, while at the same time avoiding contamination of the fluid. Filter equipment and filter modules may be sterilized by the action of chemicals or by heat. The use of chemicals has a series of disadvantages due to chemical attack, such as requirements for additional rinsing operations, an environmentally friendly disposal of the residues, and damage to the membranes and to other elements of the module. By the use of heat sterilization, one is spared the controlled rinsing of disinfecting chemicals and the difficulties surrounding the disposal of residues. Typically, heat sterilization is carried out either by heating the equipment with hot water to at least 80° C. for at least 30 minutes, or with superheated steam at a temperature between 120° and 140° C., the latter being conducted either in autoclaves or by in-line injection of steam.

Although hot water sterilization destroys most bacteria, yeasts, and molds, complete sterilization is not always attained. Sterilization in an autoclave is subject to the danger of recontamination upon removal and reconnection of the module to the sterilized filtration plant equipment. Because of these drawbacks, the preferred sterilization method is the in-line, superheated steam procedure.

Because of their construction and the materials employed, current commercially available spiral-wound cross-flow modules cannot withstand the thermal and pressure demands of heat sterilization. The temperatures used in superheated steam sterilization and in autoclaves run up to 140° C. and pressures run as high as $4 \times 10^5$ Pa. Such extreme conditions on the one hand cause shrinkage of up to 10% in the case of many of the polymers for spiral-wound modules, and on the other hand cause a kind of radial expansion of the wound module which leads to an irreversible loosening of the spiral-wound coil, which results in a telescopic protrusion of the module. The radial expansion and telescoping protrusion in turn lead to bypassing and blockages in the module and to damage of the module construction and the membranes, rendering the filter modules useless.

It is therefore a principal object of the present invention to provide a spiral-wound cross-flow filter module having organic polymer membranes which are heat-sterilizable and mechanically stable under extreme sterilizing conditions.

This object and others will become apparent upon consideration of the invention, which is summarized and described in detail below.

SUMMARY OF THE INVENTION

The present invention is a filter module comprising a protective outer shell formed by winding a composite cord or laminate; a central core tube; and filter membranes and related elements such as feed and permeate channels and spacers, all spiral-wound between the outer shell and the tube.

DETAILED DESCRIPTION OF PREFERRED EMBODIMENTS

Figure 1:
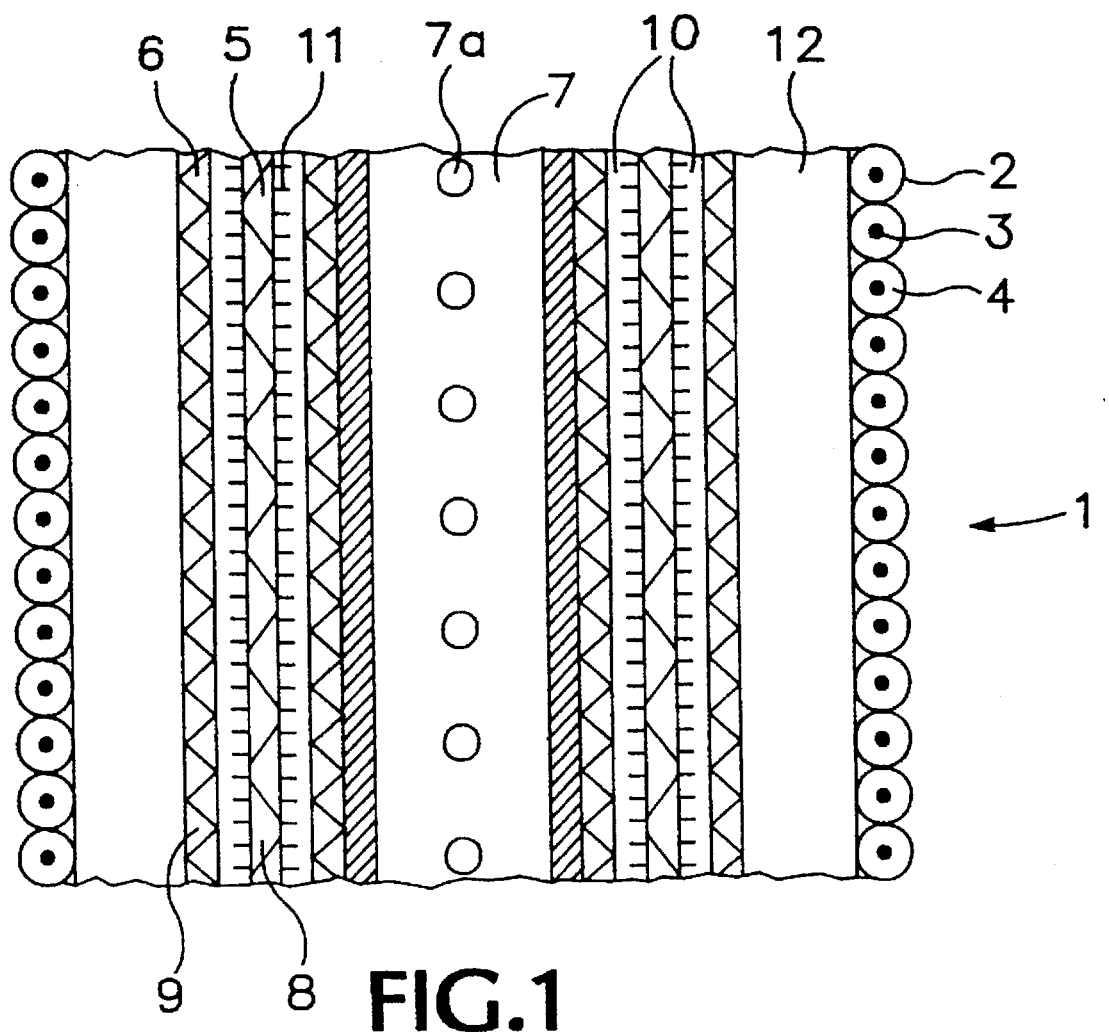
FIG. 1 is a cross-sectional view of an exemplary module of the present invention.

FIG. 1 shows a longitudinal section through an exemplary spiral-wound module of the present invention having a wound cord 2 making up an outer protective shell 1 which may be either helically or crosswise wound. Such an outer shell may be fabricated with adjustable tensioning on the outermost wrap of the spiral-wound filter portion of the module. The cord 2 has a polyester core 3, preferably of polyethylene terephthalate or polybutylene terephthalate, which is encased in a polyalkylene sheath 4. The preferred diameter of the core 3 is about 0.4 mm, while the preferred diameter of the whole cord 2 is from 0.8 to 2 mm. The core 3 is bonded to the polyalkylene sheath 4 by heating, and surrounds the spiral-wound membrane.

The spiral-wound permselective membrane filtration component comprises membrane sheeting 10 sandwiching permeate collectors 5 of a polyalkylene fabric, which are in turn enclosed by spiral-wound spacers 6 between each wrap of the spiral-wound membrane, and are made of a polyalkylene fabric or of an extruded network. The membrane sheeting 10 is wound in multiple wraps around a central core tube 7 having perforations 7a, the tube preferably being made of polyalkylene; for ease in understanding the invention, only one wrap is shown, but it is to be understood that one or more additional wraps of sheeting 10, permeate collectors 5 and spacers 6 may occupy the space 12. With respect to the sheath 4, the membrane sheeting 10, the permeate collectors 5, the spacers 6, and the central core tube 7, preferred polyalkylenes are polypropylene and poly(4-methyl-1-pentene).

Permeate collectors 5 define permeate channels 8 for the discharge of the permeate, while spacers 6 define feed inlets 9 for the fluid to be filtered. The membrane sheeting 10 preferably comprises a supported membrane which has its supported side 11 adjacent permeate channels 8 and permselective side 10 facing feed inlet 9. The fluid to be filtered flows tangentially through feed inlets 9 across membrane sheeting 10, while the permeate which has permeated through the membrane follows the path of permeate channels 8 into central core tube 7 through perforations 7a and is then discharged.

The outer protective shell 1 may comprise wound cord, wound fabric, or wound laminated material that is preferably a heat-resistant, first polymer within a sheath of a thermoplastic second polymer. The heat-resistant first polymer assures that the module will retain its generally cylindrical shape in an environment of high temperatures and pressures, which arise in the course of sterilization or because of back-pressure in the system. Further, by the provision of mechanical rigidity, the first polymer significantly retards radial expansion and telescopic protrusion of the spiral-wound filtration component comprising elements 10, 5 and 6. The chemical resistance of the second polymer, which encases the first polymer, minimizes contact of aggressive chemicals, particularly acids and bases, with the first polymer. The thermoplastic nature of the second polymer allows welding of the outer protective shell of the module to the spiral-wound filter component by the application of temperature in excess of the melting point of the second polymer, thereby obviating the need for any adhesive. This is a significant advantage in that, by avoiding adhesives for securing the outer shell, the possibility of contaminating the fluid to be filtered by adhesive decomposition is excluded. The preferred ratio of the first polymer to the second polymer is from 2:1 to 5:1. In the case of a wound cord having a core of the heat-resistant, rigid first polymer, the ratio of the diameter of the core to the diameter of the overall cord is preferably from 1:2 to 1:5.

The thermoplastic welding may take place around the entire surface of the outer protective shell 1 or in the form of a diagonal seam lengthwise along the same module or, in the case of fabric or laminate, at the juncture of the two ends of the same. Depending upon the module construction and its loading during operation, in the case of a wound cord, the welding may also take place on the ends of the winding.

During fabrication of outer protective shell 1, the cord 2 may be wound with a constant tension, so that over the entire module, feed and permeate channels are formed with approximately equal widths. By changing the tensioning during the winding, differing pressures of the outer protective shell 1 may be brought to bear upon selected zones of the module, thereby establishing sections with slightly narrowed or widened flow channelling, allowing greater filtration capacity and longer module life because of the resulting freer flow. Beyond this, to assure shape stability, it is possible to increase the cord tensioning in the cord winding or to provide overlapping windings in those zones of the module where the radial expansion forces are particularly high. Tolerances in outside dimensions of the spiral-wound module, as well as out-of-round deviations may be compensated for by changes in tension of the wound cord 2 or by the addition of multiple layers of wound cord 2. In practice, such tolerances are of interest when materials of differing thicknesses are employed in the fabrication of the spiral-wound module when deviations from tolerances are caused by different thicknesses of the membrane sheeting 10 or permeate collectors 5 or spacers 6. Appropriate techniques of obtaining the most favorable coil tensioning can be readily learned by one of ordinary skill in the art.

If the materials out of which the module is made have a tendency to shrink in length, breadth, or thickness of more than 4%, they are preferably tempered before they are used in the module. Such tempering can either be in a drying cabinet or in an autoclave at temperatures between 80° and 120° C. for a dwell time sufficient to reach the desired shrinkage, generally from 4 to 8 hours. The materials are thereby preshrunk so that at the temperatures required for heat sterilization in the module in which they are installed, they will experience no further shrinkage, which would otherwise lead to the destruction of the filter module. The maximum shrinkage of the materials should not exceed 4% preferably 2%. Depending upon the composition of the material, it is possible as well to temper the central core tube 7, the permeate collectors 5, the membrane sheeting 10, the spacers 6, and the wound cord 2, or the laminar substances from which the protective shell is made.

Upon completion of fabrication, the modules may be sterilized in autoclaves or by in-line injection of superheated steam. After more than 30 sterilization cycles of 30 minutes duration at 121° C. and 134° C., the modules of the present invention have been shown to be mechanically stable, leaktight, and ready to install and use. If an in-line superheated steam sterilization at temperatures higher than 121° C. is required, then polypropylene or poly(4-methyl-1-pentene), preferably the latter, is employed as the thermoplastic second polymer.

The spiral-wound modules of the present invention can be fabricated as ultrafiltration modules or as microfiltration modules. For ultrafiltration modules, ultrafiltration membranes are employed, from materials selected from the group consisting of cellulose and cellulose derivatives, polysulfones, and polyethersulfones. For microfiltration modules, microfiltration membranes are used, which are selected from the group consisting of cellulose ester, cellulose hydrate, polyamides, polysulfones, polyethersulfones, polyvinylidene-halides, polyfluoroethylenes and polypropylenes. Preferably, the membranes used in both types of module are supported.

EXAMPLE 1

A spiral-wound microfiltration module of the present invention was fabricated, the module having a membrane filter surface area of 5 $m^2$. The module consisted of an outer protective shell surrounding a filter component, the shell comprising a helically wound cord having a core of polyethylene terephthalate of 0.4 mm diameter and a sheath of poly(4-methyl-1-pentene) of 1.2 mm diameter which was thermally welded over the entire outside of the sprial-wound filter component. The filter component consisted of a 0.2 μm-thick polyethersulfone membrane supported on polypropylene fleece, a 600 μm-thick polypropylene woven fabric as the permeate collector, an extruded network of 1050 μm-thick polypropylene as a spacer, and a perforated polypropylene core tube, all of which were preshrunk in an autoclave at 110° C. for 6 hours, and sterilized in an autoclave at a temperature of 140° C. for a period of 30 minutes.

After 20 filtration/sterilization cycles, the so-fabricated spiral-wound module had the performance shown in Table 1 with no deformation whatsoever.

TABLE 1

|  | Water[1] Retentate Flow ($m^3$/hr-$m^2$) | Water[2] Permeate Flow ($m^3$/hr-$m^2$) | Red Wine[3] Permeate Flow ($m^3$/hr-$m^2$) | Turbidity Value[4] |
|---|---|---|---|---|
| Before sterilization | ~1.5 | 0.55 | 0.07 | 0.15 |
| After 20 cycles sterilization | ~1.5 | 0.51 | 0.06 | 0.15 |

[1]$\Delta p = 1 \times 10^5$ Pa
[2]MTD = $1.5 \times 10^5$ Pa
[3]MTD = $2.5 \times 10^5$ Pa, $\Delta p = 1 \times 10^5$ Pa on retentate side
[4]European Brewery Convention Standard

EXAMPLE 2

A spiral-wound microfiltrations module of substantially the same construction as in Example 1 was repeatedly used for filtration and sterilized in-line with superheated steam at 134° C. for periods of 30 minutes. After 30 filtration/sterilization cycles under the same operating conditions as in Example 1 the module had no deformation of any kind with the performance shown in Table 2 (reported in the same units as in Table 1).

TABLE 2

|  | Water Retention Flow | Water Permeate Flow | Red Wine Permeate Flow | Turbidity Value |
|---|---|---|---|---|
| Before sterilization | ~1.5 | 0.55 | 0.07 | 0.15 |
| After 30 cycles sterilization | ~1.5 | 0.51 | 0.06 | 0.15 |

EXAMPLE 3

An ultrafiltration module of substantially the same construction as in Example 1, but with a membrane having a molecular weight cut-off of 300,000 daltons and a polypropylene-sheathed cord was repeatedly used for filtration as in Example 1 and sterilized in-line with superheated steam at 121° C. for periods of 30 minutes.

After 30 filtration/sterilization cycles, the module still showed no kind of deformation, with the performance shown in Table 3 (reported in the same units as in Table 1).

TABLE 3

|  | Water Retention Flow | Water Permeate Flow | Red Wine Permeate Flow | Turbidity Value |
|---|---|---|---|---|
| Before sterilization | ~1.5 | 0.3 to 0.4 | 0.05 to 0.07 | 0.02 |
| After 20 cycles sterilization | ~1.5 | 0.28 to 0.37 | 0.05 to 0.07 | 0.02 |

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A heat-sterilizable filter module comprising:
   (a) a fluid-transmitting perforated central core tube,
   (b) an outer protective shell, and
   (c) a spiral-wound polymeric permselective membrane between (a) and (b),
   wherein said outer protective shell comprises a heat-resistant, rigid first polymer within a sheath of a thermoplastic second polymer.

2. The module of claim 1 wherein said outer protective shell is in a form selected from a wound cord, a wound fabric, and a wound laminate.

3. The module of claim 2 wherein said first polymer is selected from the group consisting of polyethylene terephthalate and polybutylene terephthalate and said second polymer is selected from the group consisting of polypropylene and poly(4-methyl-1-pentene).

4. The module of claim 1 wherein said outer protective shell comprises a composite cord wound around said spiral-wound permselective membrane into a substantially cylindrical shape.

5. The module of claim 4 wherein said cord is wound around said spiral-wound permselective membrane in predetermined zones by a method selected from increased windings, increased tension, and decreased tension.

6. The module of claim 4 wherein said first polymer is polyethylene terephthalate and said second polymer is poly(4-methyl-1-pentene).

7. The module of claim 1 wherein said spiral-wound permselective membrane is a supported membrane.

8. The module of claim 7 wherein the support of said supported membrane is polypropylene.

9. The module of claim 8 wherein said supported membrane is selected from the group consisting of cellulose, cellulose esters, cellulose hydrate, polyamides, polysulfones, polyethersulfones, polyvinylidene halides, polyfluoroethylenes, and polypropylene.

10. The module of claim 1 wherein said central core tube and said spiral-wound permselective membrane are shrunken prior to incorporation into said module.

* * * * *